United States Patent [19]

Shiroki

[11] Patent Number: 4,483,754
[45] Date of Patent: Nov. 20, 1984

[54] ELECTROLYSIS OF SODIUM CHLORIDE WITH THE USE OF ION EXCHANGE MEMBRANES

[75] Inventor: Hiroyuki Shiroki, Nobeoka, Japan

[73] Assignee: Asahi Kasei Kogyo Kabushiki Kaisha, Osaka, Japan

[21] Appl. No.: 585,177

[22] Filed: Mar. 1, 1984

[30] Foreign Application Priority Data

Mar. 4, 1983 [JP] Japan .................... 58-34625

[51] Int. Cl.³ ............... C25B 1/16; C25B 1/26
[52] U.S. Cl. ...................... 204/98; 204/128; 210/683
[58] Field of Search .......... 204/98, 128; 210/683

[56] References Cited

U.S. PATENT DOCUMENTS

| | | | |
|---|---|---|---|
| 1,051,984 | 2/1913 | Cameron | 204/98 |
| 1,308,509 | 7/1919 | Riiber | 204/98 |
| 1,386,244 | 8/1921 | Dow | 204/98 |
| 1,843,127 | 2/1932 | Girvin | 204/128 |
| 2,982,608 | 5/1961 | Clement | 204/98 |
| 3,660,261 | 5/1972 | Wright et al. | 204/98 |
| 4,038,365 | 7/1977 | Patil et al. | 204/98 |
| 4,060,465 | 11/1977 | Yokota et al. | 204/128 |
| 4,116,781 | 9/1978 | Dorio et al. | 204/98 |
| 4,155,820 | 5/1979 | Ogawa et al. | 204/98 |
| 4,176,022 | 11/1979 | Darlington | 204/98 |
| 4,202,743 | 5/1980 | Oda et al. | 204/98 |
| 4,207,152 | 6/1980 | Kadija et al. | 204/98 |

FOREIGN PATENT DOCUMENTS

| | | | |
|---|---|---|---|
| 0506130 | 9/1954 | Canada | 204/98 |
| 54-103786 | 8/1979 | Japan | 204/98 |

OTHER PUBLICATIONS

Japanese Exam. Patent Pub., Asahi Glass (1963) 38-9560.
Japanese Exam. Patent Pub., Orango Co. et al. (1979) 54-10357.

Primary Examiner—R. L. Andrews
Assistant Examiner—Terryence Chapman
Attorney, Agent, or Firm—Birch, Steward, Kolasch & Birch

[57] ABSTRACT

Reducing the content of iodine in an aqueous brine solution to less than 1 ppm prior to electrolysis in an electrolytic cell separated into an anode chamber and a cathode chamber by a cation exchange membrane improves the electrolytic performance thereof.

7 Claims, 1 Drawing Figure

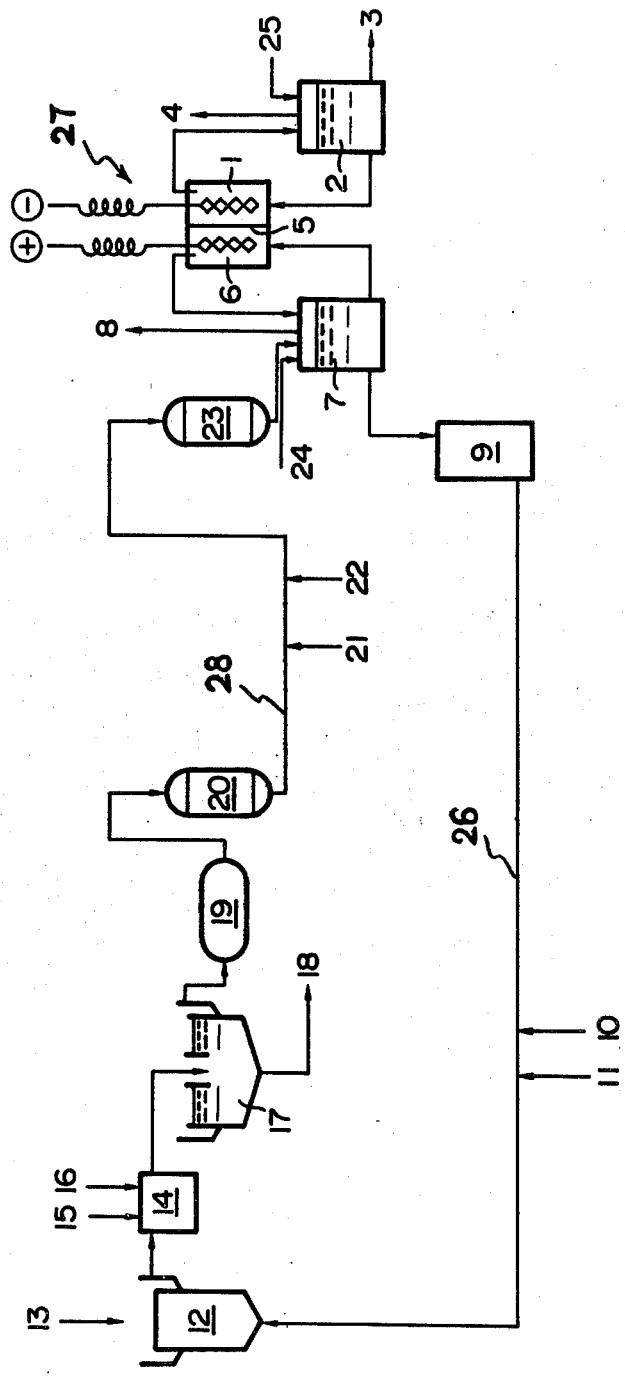

ELECTROLYSIS OF SODIUM CHLORIDE WITH THE USE OF ION EXCHANGE MEMBRANES

GENERAL STATEMENT OF THE INVENTION

This invention relates to the electrolysis of aqueous solutions of sodium chloride derived from raw material salt containing iodine compounds in an electrolytic cell which is divided into an anode chamber and a cathode chamber by a cation exchange membrane.

Rock salt or brine obtained from rock salt strata in the underground or dried sea salt has generally been used as the raw material in the electrolysis of aqueous solutions of sodium chloride on an industrial scale. It is known that such raw material salt sometimes contains significant amounts of iodine, but hitherto this factor has not been an inconvenience or disadvantage in conventional industrial electrolytic processes such as the diaphragm or mercury process. However, this is not true for the cation exchange membrane process wherein no report has yet been published, prior to the present invention, regarding the effects brought about by iodine being contained in the raw material salt or in the electrolyzing solution.

In the present invention, which is based on a study concerning the effects brought about by iodine on the cation exchange membrane process, it has been found that removal of iodine originally contained in the raw material salt prior to electrolysis will prevent the unfavorable impairment in electrolytic performance which is obtained when a cation exchange membrane is used with salt containing a high level of iodine.

Usually, rock salt or brine obtained from rock salt strata in the underground and dried sea salt contain only a minor amount of iodine, such as 1-2 ppm, but some rock salt or brine as obtained from a particular source contains iodine as sodium iodide in a concentration ranging from a few to several thousands of times this amount. Such rock salt strata normally occur in the proximity of a petroleum field or natural gas area. For instance, in such a field, by-product brackish water contains iodine at a level of from 2000 to 4000 ppm on the basis of sodium chloride (hereinafter, often noted as NaCl). Accordingly, a far larger amount of iodine in the form of sodium iodide is contained therein as compared with the usual rock salt or brine.

As stated hereinbefore, the presence of iodine exerts only a little or even no unfavorable effects on electrodes or diaphragms in the conventional diaphragm or mercury amalgam process. However, in the case of the cation exchange membrane process where, in a cell which is divided into an anode and a cathode chamber by a cation exchange membrane, an aqueous solution of NaCl is fed to the anode chamber while chlorine gas is generated at the anode, hydrogen gas is also generated at the cathode and, further sodium hydroxide (NaOH) is produced in the cathode chamber, the membrane itself is constituted of a far finer construction and is provided with cation exchange groups. Because of this difference from a diaphragm as used in the diaphragm process, iodine exerts an influence on the cation exchange membrane and causes a decrease in current efficiency and an increase in voltage. Consequently, in accordance with the present invention, the necessity of taking countermeasures with respect to the amount of iodine to be introduced into the cation exchange membrane process has been recognized.

Therefore, and in accordance with the present invention, it has been discovered that unfavorable effects on electrolysis performance in the ion exchange membrane process are avoided by maintaining the iodine content in terms of iodine in the NaCl aqueous solution starting material in an amount of not more than 1 ppm.

Hereinafter, the expression "NaCl aq. solution containing iodide compounds" in the present specification, refers to a solution containing iodine at a level above several ppm. It is for this reason that, above said content level, remarkable disadvantagges of process troubles and economical loss are incurred in the cation membrane process unless such a content of iodine is previously removed and/or reduced to 1 ppm or less. In the case where the content of iodine in the starting brine is only several ppm, whether or not to carry out a deiodination to a content level of 1 ppm or less is dependent upon the cost incurred because of the deiodination process as compared to the impaired performance resulting from conducting the electrolysis without removing or reducing the iodine content therefrom.

Suitable processes for deiodination of the starting material NaCl aqueous (aq.) solution down to a content of not more than 1 ppm include, for example, adsorption by active carbon or an anion exchange resin, or the introduction of air followed by stripping.

In the application of the active carbon process, the iodide compounds in the NaCl aq. solution are first converted to free iodo ions, which are further converted partially to molecular iodine by the addition of an oxidizing agent. Thereafter, the NaCl aq. solution is fed through an adsorption tower where particulate active carbon is packed, whereby the iodine is adsorbed and removed. As an oxidizing agent, chlorine or sodium nitrite is acceptable.

In the application of the anion exchange resin process, iodine compounds in the NaCl aq. solution are first converted to iodo ions, which are further converted partially to molecular iodine by the addition of an oxidizing agent. Thereafter, iodine is adsorbed in the form of polyiodo ions on an anion exchange resin during flow through a chlor-associated anion exchange resin tower, where the operation is preferably conducted in the acidic state. In this operation, chlorine or sodium nitrite is acceptable as an oxidizing agent. As the anion exchange resin, those having chloride type quaternary ammonium, amino or pyridine groups are suitable. The preferred resin is a strongly basic anion exchange resin having ammonium groups.

In the application of the process wherein air is blown or introduced into the brine solution, iodo compounds in the NaCl aq. solution are first converted to iodo ions and are further converted to free molecular iodine. Thereafter, the NaCl aq. solution is fed so as to flow downward from the top of a gas stripping tower while air is blown in at the bottom thereof, whereby iodine is stripped off and removed.

The deiodination processes described above can be used solely or in combination with each other.

Iodine thus removed may be recovered and then refined for use in the manufacture of pharmaceutical compounds or agricultural chemicals and the like.

Referring to the cation exchange membrane used in the electrolytic process, those having either strongly acidic ion exchange groups such as sulfonic acid or weakly acidic ion exchange groups such as carboxylic acid, sulfonanide, or phosphoric acid are suitably employed. However, in the electrolysis of NaCl where NaOH is produced in the cathode chamber, and where the current efficiency is determined by the migration of hydroxyl ions from the cathode chamber to the anode chamber, the most excellent membrane in terms of the current efficiency is a cation exchange membrane having carboxylic acid groups. Cation exchange membranes containing only carboxylic acid groups or those containing other suitable cation exchange groups, such as sulfonic acid groups, together with carboxylic acid groups are applicable in the present invention. For example, a laminated membrane comprising a sulfonic acid membrane and a carboxylic acid membrane in which the carboxylic acid groups account for a portion of the ion exchange sites is included within the applicability of the present invention. The most preferred cation exchange membrane is a cationic membrane where part of the ion exchange groups are carboxylic acid groups.

The outstanding benefits of the present invention obtained by the removal of iodine from the starting brine solution in preventing the impairment in performance represented by a decrease in the current efficiency and an inccrease in voltage are particularly notable in the case of the operation of an industrial scale sodium chloride electrolysis process using a cation exchange membrane which is capable of performing at a high current efficiency.

EXPLANATION BASED ON THE PROCESS FLOW

The accompanying drawing shows a typical process flow for introducing raw material salt to an electrolytic cell where this invention is embodied. The invention will now be explained in more detail in accordance with the drawing, however, this invention should not be limited by the flow sheet shown therein.

As shown in the drawing, electrolytic cell 27 contains cathode chamber 1 and anode chamber 6 separated by cation exchange membrane 5. Sodium hydroxide (NaOH) aq. solution is circulated between cathode chamber 1 and catholyte tank 2. NaOH aq. solution separated in catholyte tank 2 is discharged at outlet line 3, and likewise hydrogen gas separated in tank 2 is discharged through outlet line 4. The anolyte is circulated between chamber 6 and anolyte tank 7. Chlorine gas separated in tank 7 is discharged through outlet 8 and, likewise, dilute NaCl aq. solution separated therein is discharged and sent to a dechlorination tower 9. Then, supplementary water is added by line 10 to the dilute NaCl aq. solution passing through feed line 26 to a salt dissolving tank 12. Further, NaOH is added to NaCl aq. solution in feed line 26 by line 11 in an amount necessary to prevent the precipitation of magnesium hydroxide in tank 12, i.e., to the extent that the pH value thereof is maintained not higher than 9. Raw material rock salt containing iodine is fed by line 13 into tank 12 and dissolved therein. Saturated NaCl aq. solution is sent from tank 12 to a reaction vessel 14 where sodium carbonate, NaOH and the like are added by line 15, and, if necessary, barium carbonate, sodium sulfite and precipitation accelerators are added likewise by line 16. Magnesium hydroxide, calcium carbonate, ferric hydroxide, and in some cases, barium sulfate are separated in thickener tank 17. Calcium ions, magnesium ions and ferric ions which are present in the NaCl aq. solution are respectively reduced below 0.1 ppm by filter 19 and chelate resin tower 20.

Sodium hypochlorite or chlorine is added by line 21 to the NaCl aq. solution in feed line 28 so as to make the effective concentration of chlorine greater than 10 ppm. Purified hydrochloric or sulfuric acid is added by line 22 to maintain the pH value below 2. Iodine is reduced to a concentration of not more than 1 ppm in anion exchange tower 23. The purified, substantially saturated NaCl aq. solution thus treated is fed to anolyte tank 7. Line 24 to anolyte tank 7 is used to feed hydrochloric acid, if necessary, to control the pH therein and line 25 to catholyte tank 2 is likewise used to feed water, if necessary, to control the concentration of the product NaOH.

The following Examples are given merely as illustrative of the present invention and are not to be considered as limiting.

EXAMPLES OF THE INVENTION

EXAMPLE 1

In the process flow as shown in the drawing, a NaCl aq. solution of 300-310 g/l from anion exchange tower 23 and hydrochloric acid from line 24 were fed to an anolyte tank 7, respectively. The NaCl concentration of the liquid circulating between anode chamber 6 and anolyte tank 7 was adjusted to 175 g/l. The pH thereof was adjusted to 2. Likewise, the catholyte tank 2 and the cathode chamber 1 were connected with circulation while the product NaOH was separated by line 3. The feed of water by line 25 was controlled to keep the NaOH concentration at 30% and the temperature of the circulating liquid was controlled at 90° C. The circulating NaCl aq. solution in anolyte tank 7 was partially discharged and sent to dechlorination tower 9 so that the operation retained a dilute NaCl aqueous solution having a chlorine concentration below 50 ppm at the discharge point of tower 9. Supplementary water was added by line 10 and NaOH was also added by line 11 so that a pH of 9 was secured at tank 12.

Rock salt containing sodium iodide in a concentration of 500 ppm was used as the raw starting material. The rock salt was dissolved in tank 12 to provide a NaCl aq. solution having a concentration of 310 g/l in which the sodium iodide concentration was 95 ppm and the temperature thereof was 60° C. Sodium carbonate, sodium hydroxide and barium carbonate were added to the brine solution in reaction vessel 14. Most of the magnesium hydroxide, calcium carbonate and barium sulfate were removed in thickener tank 17. In addition, fine precipitates of magnesium hydroxide, calcium carbonate and barium sulfate were separated by filter 19. Minor amounts of calcium ions, ferric ions and magnesium ions dissolved in the solution were removed by chelate resin tower 20 down to below 0.1 ppm.

Chlorine water was added to the saturated NaCl aq. solution by line 21 to provide an effective chlorine content of 45 ppm. Hydrochloric acid was added by line 22 to adjust the pH to 2. The NaCl aq. solution was then passed to anion exchange resin tower 23. As a result, the concentration of iodo compounds was 1 ppm (0.8 ppm in terms of iodine) at the discharge point of anion exchange resin tower 23. An anion exchange resin having chlor-type quaternary ammonium groups as a functional group was employed in tower 23. The space velocity (SV) of the passage of liquid was 2 $H^{-1}$.

The purified NaCl aq. solution thus obtained was electrolyzed using a cation exchange membrane having a perfluorosulfonic acid layer and a perfluorocarboxylic acid layer at a current density of 40 A/dm$^2$. A current efficiency of 96% at a voltage of 3.30 V, stable over long period, was obtained.

On the other hand, when the operation was conducted by bypassing anion exchange tower 23, i.e., sodium iodide was not removed from the aqueous brine solution, the voltage increased up to 3.8 V, and the current efficiency fell to 93%. In addition, the carboxylic acid layer in the membrane became white due to a deposition of iodine compounds.

EXAMPLE 2

Dried sea salt was dissolved in water, and a NaCl aq. solution of 310 g/l concentration was prepared. Sodium hydroxide and sodium carbonate was added thereto to adjust the pH to 10. The solution was then filtered by a fluoro pore membrane filter with pore size 0.22 micron (made by Sumitomo Electric Ind., Ltd. of japan), in order to separate magnesium hydroxide, ferric hydroxide and calcium carbonate as precipitates. The NaCl aq. solution was then passed through a chelate resin tower packed with a cation exchange resin having aminoalkyl phosphoric acid groups as the ion exchange sites in order to reduce dissolved calcium ions, ferric ions and magnesium ions down to a concentration below 0.1 ppm. The purified NaCl aq. solution was divided into five portions, to each of which sodium iodide was added in different amounts to prepare the following samples, in which the ppm concentrations were given as free iodine:

| Sample | 1 ... 0.4 | ppm free iodine |
|---|---|---|
| Sample | 2 ... 1 | ppm free iodine |
| Sample | 3 ... 5 | ppm free iodine |
| Sample | 4 ... 10 | ppm free iodine |
| Sample | 5 ... 100 | ppm free iodine |

Electrolysis was conducted in five electrolytic process systems comprising perforated titanium anodes covered with solid solutions of ruthenium, titanium and zirconium oxide and perforated steel-made cathodes and cation exchange membranes consisting of a layer having carboxylic acid groups and a layer having sulfonic acid groups. The current applied area was 1 dm$^2$ in size. The cation exchange membranes were placed such that the carboxylic acid side faces the cathode. In operation, the five salt water samples having different iodine contents were individually supplied to the five electrolytic systems and the anolyte was controlled so that the NaCl concentration thereof was 175 g/l. Pure water was supplied to the cathode chamber so that the NaOH concentration was controlled to be 30%. The electrolysis was carried out continuously in the five systems at a current density of 40 A/dm$^2$ at 90° C., over a period of 10 months. Table 1 shows the performance data represented by electrolytic voltage and current efficiency with time over the term of the experiment.

TABLE 1

| Sample No. | Iodine conc. (ppm) | | Inital | After 1 month | After 3 months | After 10 months |
|---|---|---|---|---|---|---|
| 1 | 0.4 | Electrolytic voltage (V) | 3.30 | 3.30 | 3.30 | 3.30 |
| | | Current efficiency(%) | 96 | 96 | 96 | 96 |
| 2 | 1 | Electrolytic voltage (V) | 3.30 | 3.30 | 3.30 | 3.30 |

TABLE 1-continued

| Sample No. | Iodine conc. (ppm) | | Inital | After 1 month | After 3 months | After 10 months |
|---|---|---|---|---|---|---|
| | | Current efficiency (%) | 96 | 96 | 96 | 96 |
| 3 | 5 | Electrolytic voltage (V) | 3.30 | 3.35 | 3.45 | — |
| | | Current efficiency (%) | 96 | 95 | 93.5 | — |
| 4 | 10 | Electrolytic voltage (V) | 3.30 | 3.40 | — | — |
| | | Current efficiency (%) | 96 | 94 | — | — |
| 5 | 100 | Electrolytic voltage (V) | 3.30 | 3.80* | — | — |
| | | Current efficiency (%) | 96 | 93 | — | — |
| | | | 96 | 93 | — | — |

*This membrane looked white colour owing to deposition of iodine compounds, one of which being identified as Na$_3$H$_3$IO$_3$ by X-ray diffraction.

EXAMPLE 3

To a NaCl aq. solution of pH 6.5, containing iodine in a concentration of 12 ppm, chlorine water was added so that the chlorine concentration thereof was not more than 6 ppm. This salt water solution was sprayed to the top of an iodine stripping tower at a rate of 1 m$^3$/H. The diffusion tower measures 50 cm×50 cm square in section and 5 meters in height where tellerette packing (made by Nittetsu Chemical Engineering Co., Ltd. of Japan) were packed to 4.5 meters in height. Air was blown in at the bottom of the tower at a rate of 3000 m$^3$/H and was diffused out at the top thereof. The upwardly-flowing air underwent countercurrent contact with the downwardly-flowing iodine-containing salt water solution, which reduced the iodine content to 0.7 ppm. The NaCl concentration thereof was 300 g/l after this treatment.

The pH of the NaCl aq. solution thus treated was adjusted to 10. Sodium carbonate was added thereto in order to remove calcium. Thereafter, the solution was filtered and passed through a chelate resin tower. As a result, the concentration of calcium, magnesium and ferric ions, respectively, was reduced below 0.1 ppm in the purified NaCl aq. solution. The purified brine solution was then electrolyzed by a cation exchange membrane process in the same manner as described in Example 2. A stable electrolytic voltage and current efficiency were obtained over a period of 3 months of operation with no decrease in performance.

The invention being thus described, it will be obvious that the same may be varied in many ways. Such variations are not to be regarded as a departure from the spirit and the scope of the invention, and all such modifications are indicated to be included within the scope of the following claims.

I claim:

1. In a process for the electrolysis of an aqueous solution of sodium chloride derived from raw material salt containing iodine compounds wherein an electric current is passed through said solution in an electrolytic cell separated into an anode chamber and a cathode chamber by a cation exchange membrane, the improvement which comprises reducing the content of iodine in the aqueous sodium chloride solution charged into the anode chamber to a content of less than 1 p.p.m. prior to electrolysis.

2. The process of claim 1, wherein iodine compounds contained in said aqueous sodium chloride solution are removed by adsorption on an anion exchange membrane prior to electrolysis.

3. The process of claim 1, wherein iodine compounds contained in said aqueous sodium chloride solution are converted to molecular iodine and the molecular iodine is then stripped from the solution prior to electrolysis.

4. The process of claim 3, wherein the molecular iodine is stripped from the solution by means of air.

5. The process of claim 1, wherein iodine compounds contained in said aqueous sodium chloride solution are converted to molecular iodine and the molecular iodine is adsorbed by active carbon prior to electrolysis.

6. The process of claim 1, wherein the cation exchange membrane contains carboxylic acid groups.

7. The process of claim 1, wherein the cation exchange membrane contains carboxylic acid groups and sulfonic acid groups.

* * * * *